(12) United States Patent
Egilmez et al.

(10) Patent No.: US 10,887,261 B2
(45) Date of Patent: Jan. 5, 2021

(54) DYNAMIC ATTACHMENT DELIVERY IN EMAILS FOR ADVANCED MALICIOUS CONTENT FILTERING

(71) Applicant: MICROSOFT TECHNOLOGY LICENSING, LLC, Redmond, WA (US)

(72) Inventors: Bulent Egilmez, Seattle, WA (US); Krishna Kumar Parthasarathy, Redmond, WA (US); Rui Chen, Bellevue, WA (US); Anurag Pahwa, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 97 days.

(21) Appl. No.: 14/927,800

(22) Filed: Oct. 30, 2015

(65) Prior Publication Data
US 2017/0034091 A1 Feb. 2, 2017

Related U.S. Application Data

(60) Provisional application No. 62/199,160, filed on Jul. 30, 2015.

(51) Int. Cl.
*H04L 12/58* (2006.01)

(52) U.S. Cl.
CPC ............ *H04L 51/12* (2013.01); *H04L 51/063* (2013.01); *H04L 51/08* (2013.01); *H04L 51/22* (2013.01)

(58) Field of Classification Search
CPC ......... H04L 51/08; H04L 51/12; H04L 51/22; H04L 51/063
USPC ....................................................... 709/206
See application file for complete search history.

(56) References Cited

U.S. PATENT DOCUMENTS

| | | | |
|---|---|---|---|
| 5,832,208 A | * | 11/1998 | Chen .................... G06F 21/564 709/206 |
| 7,134,142 B2 | | 11/2006 | Smith |

(Continued)

FOREIGN PATENT DOCUMENTS

| | | |
|---|---|---|
| EP | 2320365 A1 | 5/2011 |
| GB | 2357939 A | 7/2001 |

(Continued)

OTHER PUBLICATIONS

"International Search Report and Written Opinion Issued in PCT Application No. PCT/US2016/044130", dated Nov. 2, 2016, 11 Pages.

(Continued)

*Primary Examiner* — Umar Cheema
*Assistant Examiner* — John Fan
(74) *Attorney, Agent, or Firm* — Michael Best & Friedrich LLP (57) ABSTRACT

Technologies are described for dynamic attachment delivery in emails for advanced malicious content filtering. An email service may intercept emails with attachments (or other threats such as links, embedded objects, etc.) and detach the threat (e.g., attachment) from the email allowing the email to be forwarded to the recipient without delay. The threat may be sequestered and analyzed. If the threat is determined to be harmless, it may be reattached to the email and the client notified so they can open the attachment, activate the link, or perform comparable actions.

20 Claims, 6 Drawing Sheets

(56) References Cited

U.S. PATENT DOCUMENTS

| | | | |
|---|---|---|---|
| 7,634,814 | B1 | 12/2009 | Sobel et al. |
| 7,870,205 | B2 | 1/2011 | LeVasseur et al. |
| 8,006,301 | B2 | 8/2011 | Huddleston |
| 8,688,790 | B2 | 4/2014 | LeVasseur et al. |
| 9,009,820 | B1 | 4/2015 | McDougal et al. |
| 9,177,293 | B1* | 11/2015 | Gagnon ............... G06Q 10/107 |
| 2002/0004908 | A1* | 1/2002 | Galea .................. H04L 63/1416 726/24 |
| 2002/0034281 | A1* | 3/2002 | Isaacs .................... H04L 51/34 379/88.12 |
| 2004/0054498 | A1 | 3/2004 | Shipp |
| 2005/0091321 | A1* | 4/2005 | Daniell .................. H04L 51/12 709/206 |
| 2006/0129644 | A1* | 6/2006 | Owen .................... H04L 51/12 709/206 |
| 2006/0129650 | A1* | 6/2006 | Ho ...................... H04L 67/2804 709/207 |
| 2009/0220166 | A1 | 9/2009 | Choi et al. |
| 2009/0307370 | A1 | 12/2009 | Boerries et al. |
| 2011/0231499 | A1* | 9/2011 | Stovicek ........... H04M 1/72547 709/206 |
| 2014/0020047 | A1* | 1/2014 | Liebmann ............... H04L 63/20 726/1 |
| 2014/0215617 | A1 | 7/2014 | Smith et al. |
| 2016/0269422 | A1* | 9/2016 | McDougal ............ G06F 16/116 |

FOREIGN PATENT DOCUMENTS

| | | |
|---|---|---|
| WO | 9810342 A2 | 3/1998 |
| WO | 2009003059 A1 | 12/2008 |

OTHER PUBLICATIONS

"Microsoft positioned as a Leader in Gartner's 2015 Magic Quadrant for Secure Email Gateways", Published on: Jul. 20, 2015 Available at: https://blogs.office.com/2015/07/20/microsoft-positioned-as-a-leader-in-gartners-2015-magic-quadrant-for-secure-email-gateways/.

"FortiGate SMTP "splice" behavior and 'Replacement Messages'", Retrieved on: Jul. 27, 2015 Available at: http://kb.fortinet.com/kb/documentLink.do?externalID=10662.

"Strip / dump attachments—notifying recipient of removed attachments", Published on: Aug. 29, 2011 Available at: http://www.codetwo.com/kb/strip-dump-attachments-notifying-recipient-of-removed-attachments/.

"Anti-virus scanning attachments", Published on: Aug. 19, 2014 Available at: https://support.google.com/mail/answer/25760?hl=en.

Bajaj, et al., "Can We CAN the Email Spam", In Proceedings of Fourth Cybercrime and Trustworthy Computing Workshop, Nov. 21, 2013, pp. 36-43.

"Advanced Threat Prevention with OPSWAT Metascan", Published on: Jul. 14, 2014 Available at: http://www.policypatrol.com/metascan-advanced-threat-prevention/.

Alrashid, et al., "Reverse of E-mail Spam Filtering Algorithms to Maintain E-mail Deliverability", In Proceedings of Fourth International Conference on Digital Information and Communication Technology and it's Applications, May 6, 2014, pp. 297-300.

"Second Written Opinion Issued in PCT Application No. PCT/US2016/044130", dated Jun. 29, 2017, 5 Pages.

"International Preliminary Report on Patentability Issued in PCT Application No. PCT/US2016/044130", dated Oct. 16, 2017, 6 Pages.

\* cited by examiner

DYNAMIC ATTACHMENT DELIVERY IN EMAILS FOR ADVANCED MALICIOUS CONTENT FILTERING

CROSS-REFERENCE TO RELATED APPLICATIONS

This application claims the benefit under 35 U.S.C. § 119(e) of U.S. Provisional Patent Application Ser. No. 62/199,160 filed on Jul. 30, 2015. The disclosure of the U.S. Provisional Patent Application is hereby incorporated by reference in its entirety.

BACKGROUND

Email protection systems may have a layered signature based malware protection, which may be effective with traditional ways of distributing virus. Signature based engines work by searching the contents of the files submitted to them and looking for a recognized pattern (signature) that matches with malicious content. Supplementing pattern recognition with heuristic filters makes these engines even more effective since these filters help detect viruses that have not been identified yet (before the signature is released). However, the delay (e.g., hours) between the time when a virus attack starts and when a signature is available can result in many messages being delivered to the clients. The result of such a widespread or even targeted infection may be costly to the clients.

With the decline in effectiveness of traditional engine based protection solutions, there are new approaches to address advanced targeted attacks. These new technologies include behavioral analysis and traffic (or big) data analysis. Behavioral analysis is the process of loading and executing a program or file attached to an email and analyze its behavior as if it was running on an end-use system. This involves a safe environment such as a sandbox or a virtual machine known as detonation chamber. If the attachment is malicious, the message is treated as malware. This approach may be effective and reduce the detection to real-time (zero hour) but it may also be resource intensive and not easy to scale to a large volume of content.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to dynamic attachment delivery in emails for advanced malicious content filtering. In some examples, a message may be received with a potentially threat item such as an attachment. If the attachment is not a previously assessed attachment, it may be detached from the message and the message forwarded without the attachment to a recipient. Meanwhile, the attachment may be analyzed for potential threats. If the attachment is safe, it may be reattached to the delivered message. If the attachment is not found to be safe, a notification associated with the determined threat may be provided to the recipient.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly discussed above, dynamic attachment delivery may be provided in emails for advanced malicious content filtering. An email service may intercept emails with attachments (or other threats such as links, embedded objects, etc.) and detach the threat (e.g., attachment) from the email allowing the email to be forwarded to the recipient without delay. The threat may be sequestered and analyzed. If the threat is determined to be harmless, it may be reattached to the email and the client notified so they can open the attachment, activate the link, or perform comparable actions.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable memory device includes a hardware device that includes a hard disk drive, a solid state drive, a compact disk, and a memory chip, among others. The computer-readable storage medium can for example be implemented via one or more of a volatile computer memory, a non-volatile memory, a hard drive, and a flash drive.

Throughout this specification, the term "platform" may be a combination of software and hardware components to provide an email service. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example embodiments may be found in the following description.

A computing device, as used herein, refers to a device comprising at least a memory and one or more processors that includes a server, a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. Actions or operations described herein may be executed on a single processor, on multiple processors (in a single machine or distributed over multiple machines), or on one or more cores of a multi-core processor. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that allow the application or service to interact or communicate with one or more other applications and services managed by separate entities.

While example implementations are described using tasks herein, embodiments are not limited to tasks. Dynamic attachment delivery in emails for advanced malicious content filtering may be implemented in other environments, such as instant messages, data sharing, application sharing, online conferencing, and similar communications, where task data may be exchanged.

The technical advantages of providing dynamic attachment delivery in emails for advanced malicious content filtering may include, among others, increased security and efficiency communication exchange such as emails, reduced processing and network bandwidth usage (maintaining and forwarding entire emails with attachments while threats are being analyzed), and improved user interaction by allowing recipients to receive their emails promptly without delay of the threat analysis.

Embodiments address a need that arises from very large scale of operations created by networked computing and cloud based services that cannot be managed by humans. The actions/operations described herein are not a mere use of a computer, but address results of a system that is a direct consequence of software used as a service such as task services offered in conjunction with the tasks.

Figure 1:
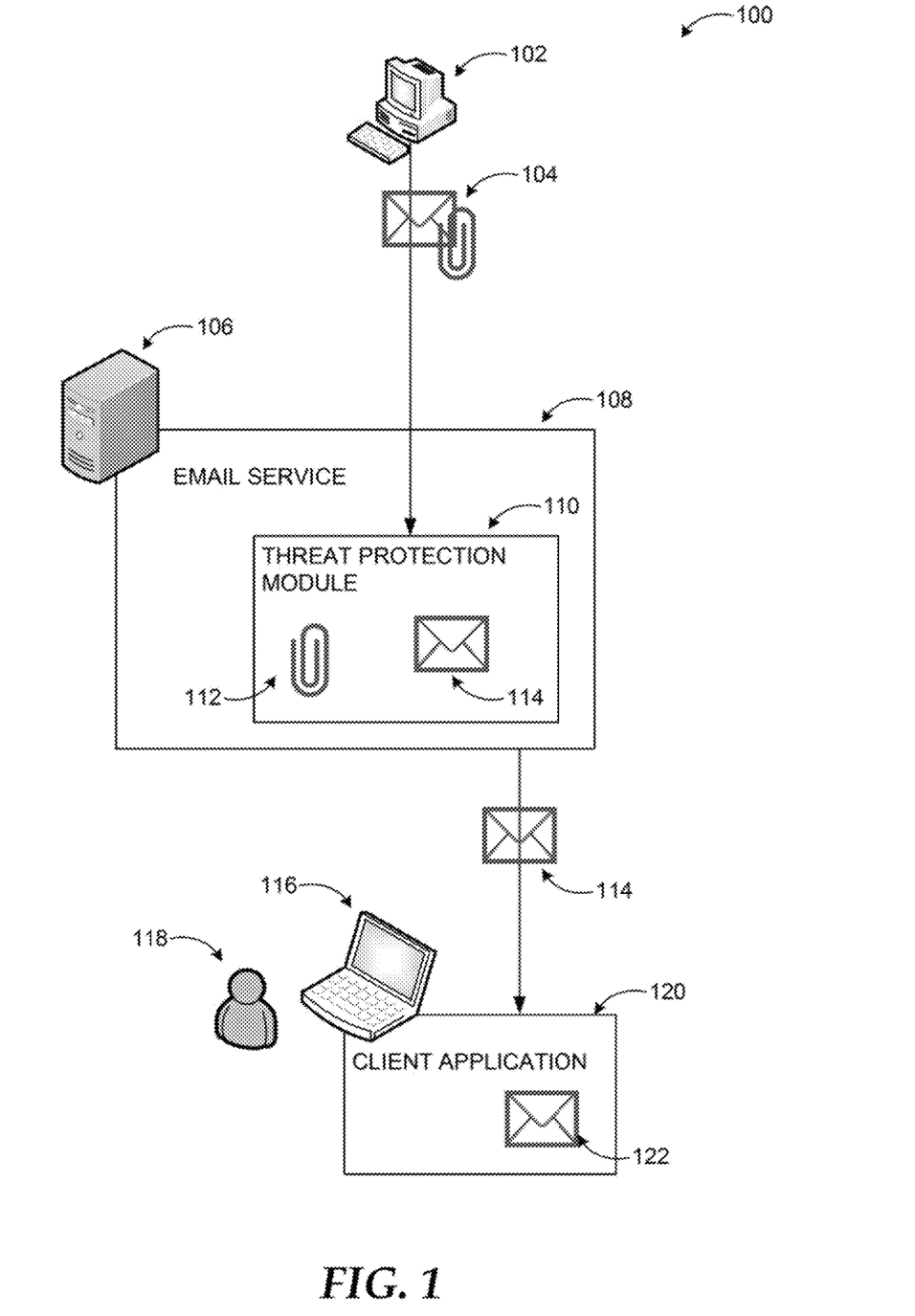
FIG. 1 illustrates conceptually the first stage in a two-stage delivery of an email with a potential threat attachment in a system according to embodiments.

FIG. 1 illustrates conceptually the first stage in a two-stage delivery of an email with a potential threat attachment in a system according to embodiments.

A system according to embodiments may enable low latency or dynamic rewriting of attachments for certain defined sets of attachments to provide protection against zero-day or other malicious attacks to the users without the latency where the message is delivered but without the attachments accessible until the threat assessment is complete for those messages.

As shown in diagram 100, a communication application executed on a computing device 102 may transmit a message 104 with an item that may pose a potential threat (e.g., an attachment, an embedded object a link, etc.) to another communication application 120 executed on computing device 116 for recipient 118. In the example of email messaging, an email service 108 executed on server 106 may facilitate the exchange of email messages and provide threat protection functionality.

Thus, the message 104 with an attachment may be received by a threat protection module or service 110 and the attachment 112 separated from the message 114 at the threat protection module or service 110. The message 14 may be delivered to the communication application 120 as message 122 without delay. The attachment 112 may be replaced with a placeholder attachment (e.g., a text message) that indicates to the recipient the attachment is being assessed for threats.

Figure 2:
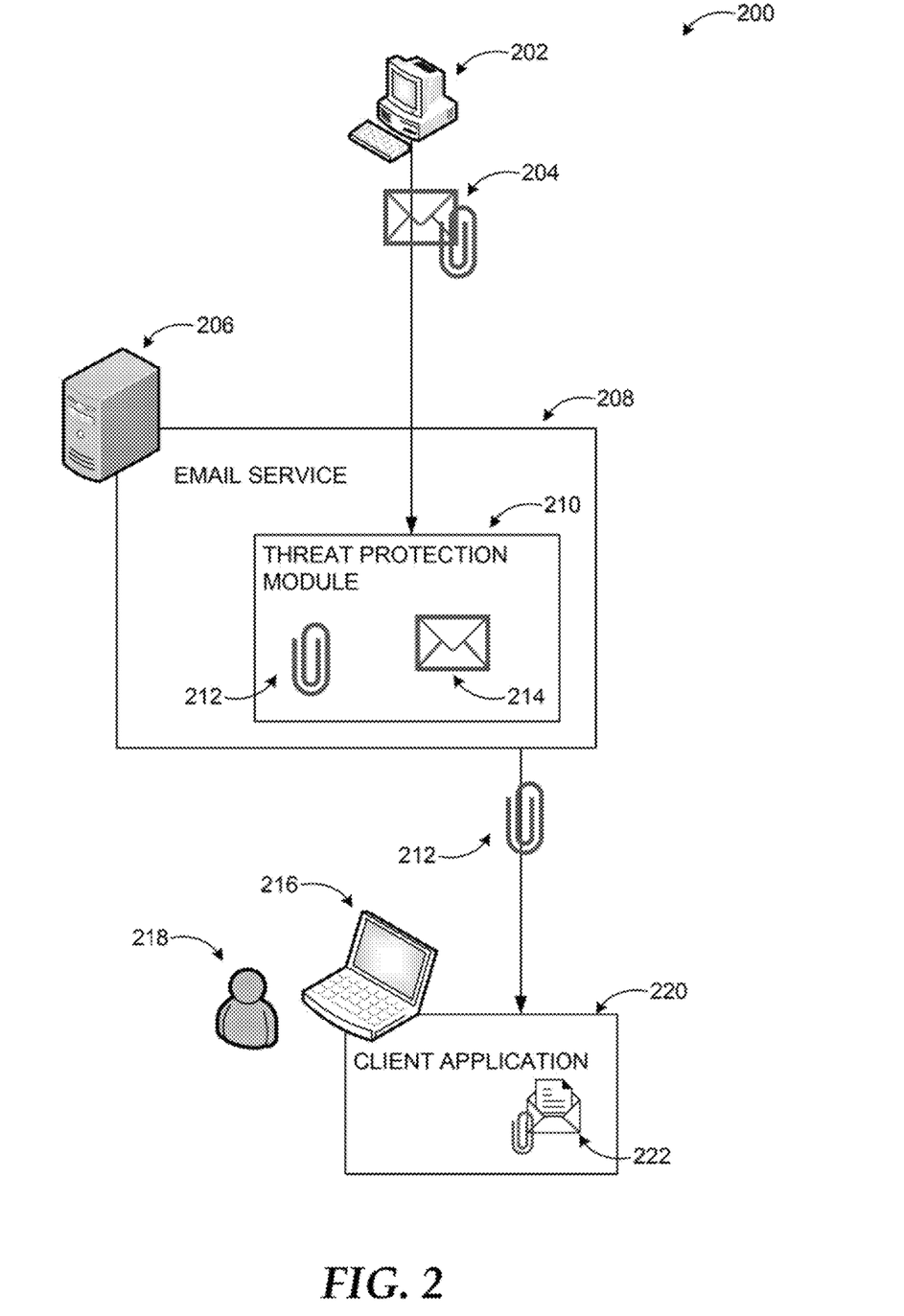
FIG. 2 illustrates conceptually the second stage in a two-stage delivery of an email with a potential threat attachment in a system according to embodiments.

FIG. 2 illustrates conceptually the second stage in a two-stage delivery of an email with a potential threat attachment in a system according to embodiments.

In the example shown in diagram 200, as in FIG. 1, a communication application executed on a computing device 202 may transmit a message with an item (204) that may pose a potential threat to another communication application 220 executed on computing device 216 for recipient 218. Email service 208 executed on server 206 may facilitate the exchange of email messages and provide threat protection functionality. Upon separation of the message 214 from the attachment 212 at the threat protection module 210 and delivery to the client application 220, the attachment 212 may be assessed for threats at the threat protection module 210. If the attachment 212 is determined to be safe, it may be reattached to the message 222 at the communication application 220 (e.g., through synchronization with the recipient's mailbox maintained by the email service 208).

The communication applications in FIGS. 1 and 2 may be locally installed client applications communicatively coupled to the email service (and other services) or "thin clients"—i.e., web browsers that provide a user interface for accessing the email service.

Figure 3:
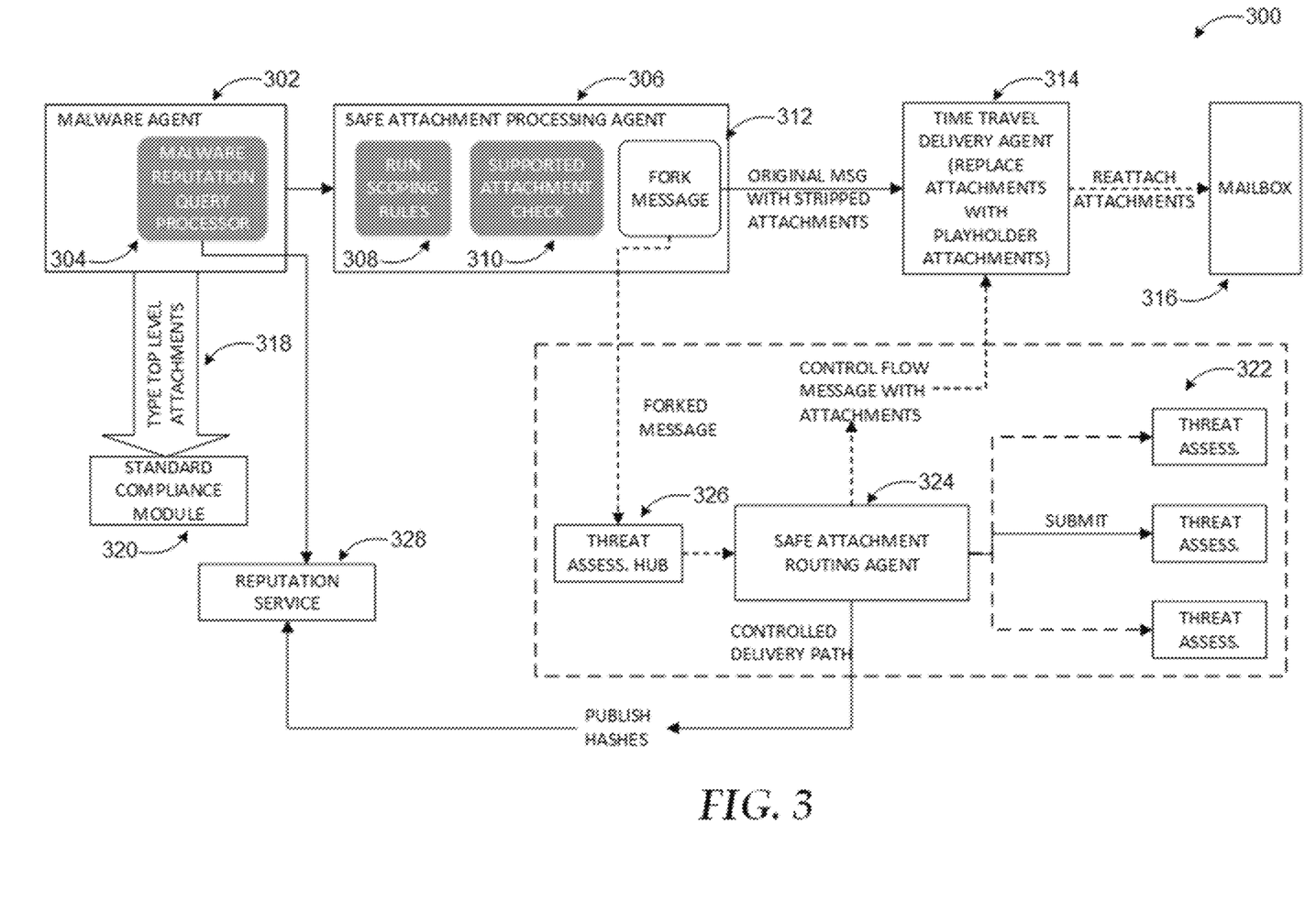
FIG. 3 illustrates an architectural diagram and action flows in an example system according to embodiments.

FIG. 3 illustrates an architectural diagram and action flows in an example system according to embodiments.

As shown in diagram 300, a message may be routed to a categorizer or malware agent 302 at an email service hub. The malware agent 302 may perform a signature based scanning and may also perform top-level attachment typing 318 and add hashes of attachments to the message header. The message may then arrive at a safe attachment processing agent 306, which may perform the scoping 308 and check if high latency option is selected or the dynamic delivery option (whether attachment processing is supported 310). If the high latency option is selected, a controlled delivery stamp may be applied and the message may be routed to the threat assessment hub otherwise the agent may fork (312) the message in two messages where the original message is stamped with a new stamp which the safe attachment routing agent 324 may look at and remove the attachments and add a placeholder attachment to the message. The copy of the message (forked) may be stamped with a controlled delivery header so the message is routed to the threat assessment hub 326 for scanning. The forked message may contain a message identifier of the original message in the header to make sure that a time travel delivery agent 314 can take appropriate action on the delivered message.

The forked message may be submitted to a safe attachment routing agent 324 for threat assessment scanning. The attachments that have the result in the header may be skipped. After the message is scanned, it may be converted to a control flow message (based on a header) and routed back to the time travel delivery agent 314 at the hub transport server. At the hub transport server, the safe attachment processing agent 306 may skip the control messages. The time travel delivery agent 314 may intercept control flow messages and retrieve the store identifier of the message based on an internet message identifier. The time travel delivery agent 314 may bind the actual message item based on the store identifier and reattach the attachments determined to be safe at the mailbox 316. The safety status may be present in the header of the control flow message.

Malware assessment configuration may be stored in a policy object called safe attachment policy, which may include the safe attachment policy and safe attachment rules. To perform the forking, a copy of the original message may be created and a header added to the original message, which the safe attachment processing agent 306 may look for and may remove the attachments and add a placeholder attachment. The copy (forked) message may be routed to the threat assessment hub 326, so the header for controlled delivery routing is applied to the copy message.

Once it is decided a message indeed has one or more unscanned supported attachments, corresponding attachments may be stripped off and placeholder attachment may be placed instead indicating that the attachment is being scanned, by the safe attachment processing agent 306. The safe attachment routing agent 324 may submit messages to the threat assessment module(s) 322 for scanning and defer until a verdict is received. Once the verdict is received, the agent may check the header of the message to see if the message needs to be converted to a control flow message before routing back to the time travel delivery agent 314 at the hub transport server.

Attachments determined to be malicious may be replaced with text attachments informing the client about the status of the attachment. Once the message is acted upon by the time travel delivery agent 314, a specific header or a property may be added to the message before storing the message back at the mailbox 322. The header may be to indicate that the message processing is complete. Thus, in case the message is resubmitted and a control message comes through for the message that has been successfully acted upon, the time travel delivery agent 314 may skip performing any actions on the delivered message.

In some embodiments, following performance counters may be maintained by the agent: number of attachments stripped, number of messages forked, number of attachments reattached, unable to bind to the store message failures, attachment stripping failures, attachment reattaching failures, message processing failures, message processing successes, query to the store failures. The collected metrics as well as other processing related information such as malicious attachment identifiers may be provided to a reputation service 328. Types of top level attachments may also be provided to a standard compliance module such as Federal Information Processing Standard (FIPS).

While the example modules, configurations, and action flows in diagram 300 are described using an email service, embodiments are not limited to emails and may be implemented in any communication service that may include attachments, embedded objects, links, or similar threats in exchanged communications such as text messages, desktop sharing, data sharing, online conferences, and comparable ones.

The example scenarios and schemas in FIG. 1 through 3 are shown with specific components, data types, and configurations. Embodiments are not limited to systems according to these example configurations. Dynamic attachment delivery in emails for advanced malicious content filtering may be implemented in configurations employing fewer or additional components in applications and user interfaces. Furthermore, the example schema and components shown in FIG. 1 through 3 and their subcomponents may be implemented in a similar manner with other values using the principles described herein.

Figure 4:
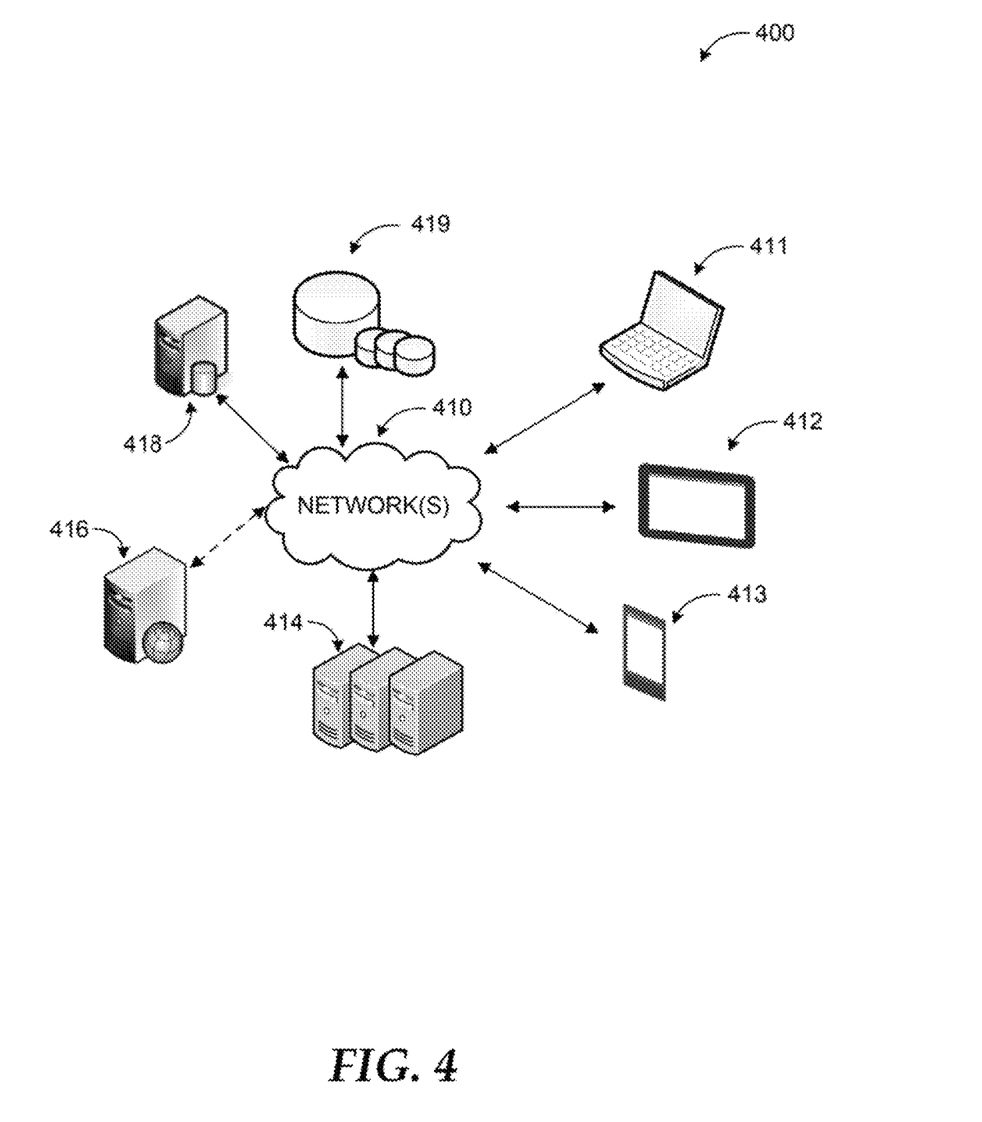
FIG. 4 is an example networked environment, arranged in accordance with at least some embodiments described herein.

FIG. 4 is an example networked environment, where embodiments may be implemented.

As shown in a diagram 400, a communication service providing email and other communication services may be implemented in a networked environment over one or more networks such as network 410. Users may access the emails (and other communication services) through locally installed or thin (e.g., browser) client applications executed on a variety of computing devices. In case of emails, the communication service may detach potential threats (e.g., attachments, links, embedded objects) from the emails (or similar communication), provide the emails to the recipients, assess the threat, and reattach the potential threat to the email if it is determined to be harmless.

A communication service, as discussed herein, may be implemented via software executed over servers 414. The servers 414 may include one or more processing servers 416, where at least one of the one or more processing servers 416 may be configured to execute one or more applications associated with the communication service. In other examples, the communication service may be provided by a third party service or may include a web application. The communication service may store data associated with data in a data store 419 directly or through a database server 418.

The network 410 may comprise any topology of servers, clients, Internet service providers, and communication media. A system according to embodiments may have a static or dynamic topology. The network 410 may include multiple secure networks, such as an enterprise network, an unsecure network, or the Internet. The unsecure network may include a wireless open network. The network 410 may also coordinate communication over other networks, such as Public Switched Telephone Network (PSTN) or cellular networks. Furthermore, the network 410 may include multiple short-range wireless networks, such as Bluetooth, or similar ones. The network 410 may provide communication between the nodes described herein. By way of example, and not limitation, the network 410 may include wireless media. The wireless media may include, among others, acoustic media, RF media, infrared media, and other wireless media.

A textual scheme, a graphical scheme, an audio scheme, an animation scheme, a coloring scheme, a highlighting scheme, and/or a shading scheme may be employed to further enhance user interaction with the provided views of email, attachment, and status information.

Many other configurations of the computing devices, the applications, the data sources, and the data distribution systems may be employed to provide dynamic attachment delivery in emails for advanced malicious content filtering. Furthermore, the networked environments discussed in FIG. 4 are for illustration purposes only. Embodiments are not limited to the example applications, modules, or processes.

Figure 5:
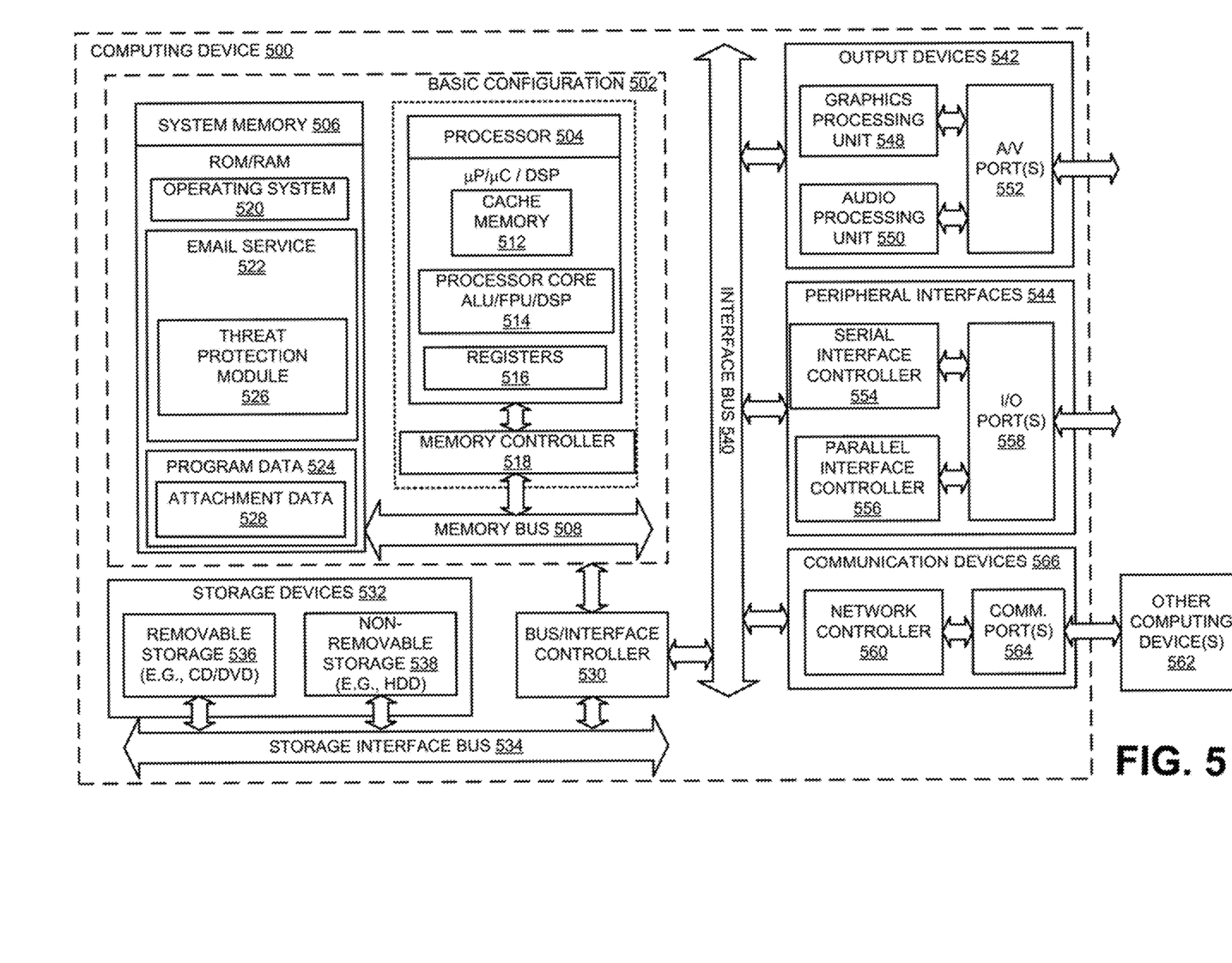
FIG. 5 illustrates a general purpose computing device, which may be configured to provide dynamic attachment delivery in emails for advanced malicious content filtering, arranged in accordance with at least some embodiments described herein.

FIG. 5 illustrates a general purpose computing device, which may be configured to provide dynamic attachment delivery in emails for advanced malicious content filtering, arranged in accordance with at least some embodiments described herein.

For example, a computing device 500 may be a server used to provide an email service, as discussed herein. In an example of a basic configuration 502, the computing device 500 may include a processor 504 and a system memory 506. The processor 504 may include multiple processors. A memory bus 508 may be used for communication between the processor 504 and the system memory 506. The basic configuration 502 may be illustrated in FIG. 5 by those components within the inner dashed line.

Depending on the desired configuration, the processor 504 may be of any type, including, but not limited to, a microprocessor (µP), a microcontroller (µC), a digital signal processor (DSP), or any combination thereof. The processor 504 may include one more levels of caching, such as a level cache memory 512, a processor core 514, and registers 516. The processor core 514 may include an arithmetic logic unit (ALU), a floating point unit (FPU), a digital signal processing core (DSP Core), or any combination thereof. A memory controller 518 may also be used with the processor 504, or in some implementations, the memory controller 518 may be an internal part of the processor 504.

Depending on the desired configuration, the system memory 506 may be of any type including but not limited to volatile memory (such as RAM), non-volatile memory (such as ROM, flash memory, etc.), or any combination thereof. The system memory 506 may include an operating system 520, an email service 522, and program data 524. The email service 522 may include a threat protection module 526, which may provide dynamic attachment delivery in emails for advanced malicious content filtering. Program data 524 may include, among others, attachment data 528.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and data storage devices 532 via a storage interface bus 534. The data storage devices 532 may be removable storage devices 536, non-removable storage devices 538, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 506, the removable storage devices 536, and the non-removable storage devices 538 may be examples of computer storage media. Computer storage media may include, but may not be limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 566) to the basic configuration 502 via the bus/interface controller 530. The one or more output devices 542 may include a graphics processing unit 548 and an audio processing unit 550, which may be configured to communicate to various external devices, such as a display or speakers via one or more A/V ports 552. The one or more peripheral interfaces 544 may include a serial interface controller 554 or a parallel interface controller 556, which may be configured to communicate with external devices, such as input devices (for example, keyboard, mouse, pen, voice input device, touch input device, etc.) or other peripheral devices (for example, printer, scanner, etc.) via one or more I/O ports 558. The one or more communication devices 566 may include a network controller 560, which may be arranged to facilitate communications with one or more other computing devices 562 over a network communication link via one or more communication ports 564. The one or more other computing devices 562 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 500 may be implemented as a part of a general purpose or specialized server, mainframe, or similar computer, which includes any of the above functions. The computing device 500 may also be implemented as a personal computer including both laptop computer and non-laptop computer configurations.

Example embodiments may also include methods to provide dynamic attachment delivery in emails for advanced malicious content filtering. These methods may be implemented in any number of ways, including the structures described herein. One such way may be by machine operations, using devices of the type described in the present disclosure. Another optional way may be for one or more of the individual operations of the methods to be performed in conjunction with one or more human operators performing some of the operations while other operations may be performed by machines. These human operators need not be co-located with each other, but each may be with a machine that performs a portion of the program. In other examples, the human interaction may be automated such as by preselected criteria that may be machine automated.

Figure 6:
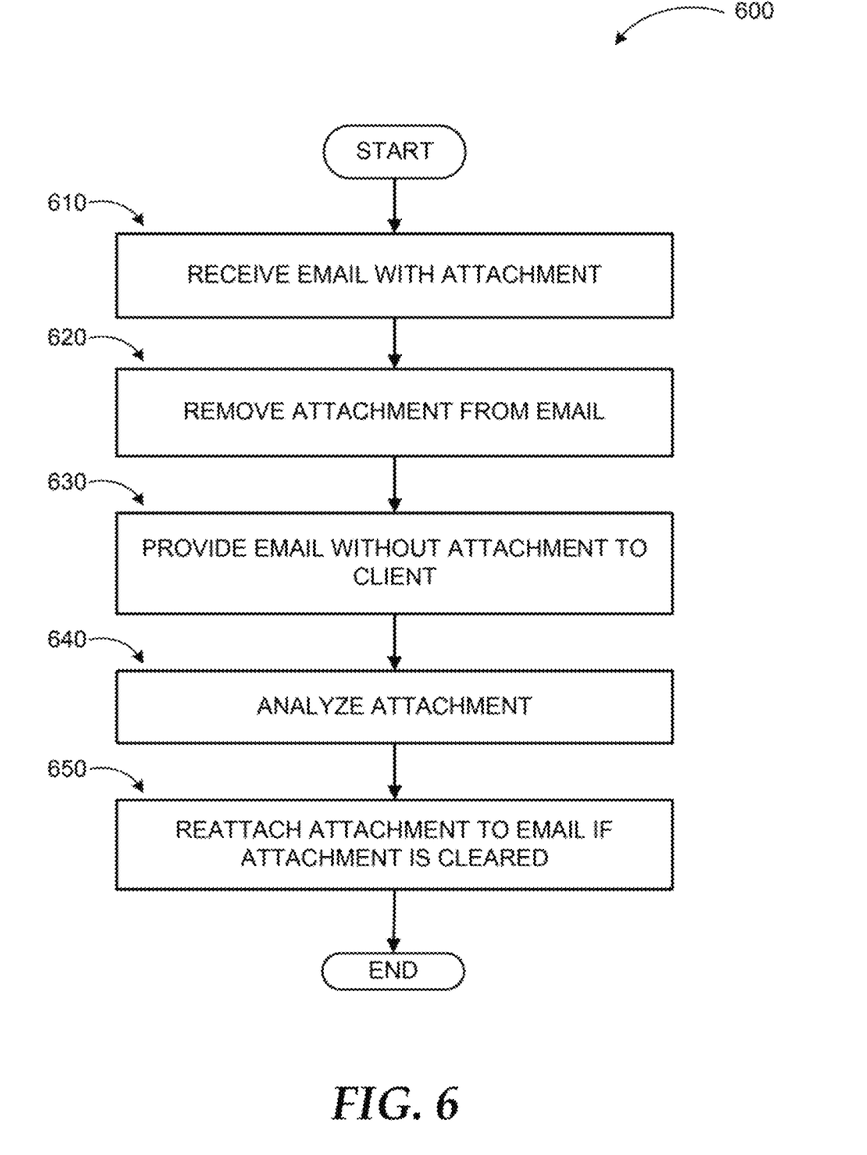
FIG. 6 illustrates a logic flow diagram for an example process to provide dynamic attachment delivery in emails for advanced malicious content filtering, arranged in accordance with at least some embodiments described herein.

FIG. 6 illustrates a logic flow diagram for an example process to provide dynamic attachment delivery in emails for advanced malicious content filtering, arranged in accordance with at least some embodiments described herein.

A process 600 may be implemented by an email service and/or its components, where the components may be executed on one or more servers or other computing devices. Dynamic attachment delivery in emails for advanced malicious content filtering may begin, according to some examples, at operation 610, where an email with a potential threat item such as an attachment may be received by a threat protection module of an email service. At operation 620, the attachment may be separated from the email, replaced with a placeholder attachment (e.g., a text message indicating the attachment is being assessed), and forwarded to the threat assessment module or service.

The email without the original attachment may be provided to the recipient(s) at operation 630. The attachment may be analyzed for potential threats at operation 640. If the attachment is found to be safe, it may be reattached to the delivered email (e.g., through synchronization of a client application with the server managed mailbox) at operation 650. If the attachment is found to be malicious, a message may be provided to the recipient(s) indicating the finding.

The operations included in process 600 are for illustration purposes. An email service to provide dynamic attachment delivery in emails for advanced malicious content filtering, according to embodiments, may be implemented by similar processes with fewer or additional steps, as well as in different order of operations using the principles described herein.

According to examples, a means for providing dynamic attachment delivery in communications for advanced malicious content filtering is described. The means may include a means for receiving a communication with a potential threat item; if the potential threat item is not a previously assessed item, a means for detaching the potential threat item from the communication and a means for delivering the communication without the potential threat item to a recipient; a means for analyzing the potential threat item for safety status; if the potential threat item is determined to be safe, a means for reattaching the potential threat item to the delivered communication; and if the potential threat item is determined to be unsafe, a means for providing a notification associated with the determination to the recipient.

According to some examples, a computing device to provide dynamic attachment delivery in emails for advanced malicious content filtering is described. An example computing device may include a memory and one or more processors coupled to the memory, where the one or more processors execute a communication application in conjunction with instructions stored in the memory. The communication application may include a message processing module configured to receive a message with an attachment and if the attachment is not a previously assessed attachment, provide the message to a threat protection module. The threat protection module may be configured to detach the attachment from the message and enable the message processing module to deliver the message without the attachment to a recipient; analyze the attachment for potential threats; if the attachment is determined to be safe from potential threats, reattach the attachment to the delivered message; and if the attachment determined to be unsafe, provide a notification associated with the unsafe determination to the recipient.

According to other examples, the threat protection module may include a malware agent configured to perform a signature based scan on the message; perform a top-level attachment typing on the attachment; and add a hash of the attachment to a message header. The threat protection module may also include a safe attachment processing agent configured to perform a check of scope for the attachment based on one or more predefined rules; and determine if one of a high latency option and a dynamic delivery option is selected.

According to further examples, the safe attachment processing agent may be further configured to if the high latency option is selected, apply a controlled delivery stamp to the message and route the message to a threat assessment hub; else fork the message into a first message copy and a second message copy, wherein the first message copy is stamped with a new stamp, the attachment removed from the first message copy, and a placeholder attachment attached to the first message copy. The safe attachment processing agent may be further configured to submit the second message copy to a safe attachment routing agent for threat assessment scanning, wherein the second message copy contains a message identifier of the first message copy in a header. The safe attachment routing agent may also be configured to convert the scanned second message copy to a control flow message based on the header; and route the control flow message to a time travel delivery agent at a hub transport server.

According to yet other examples, the time travel delivery agent may be configured to intercept the control flow message and retrieve a store identifier of the message based on an internet message identifier, bind the attachment based on the store identifier; and reattach the attachment at a mailbox of the recipient. A safety status of the attachment may be reflected in a header of the control flow message. The time travel delivery agent may also be configured to replace the attachment with a text attachment informing the recipient about an unsafe status of the attachment if the attachment is determined to be unsafe. A malware assessment configuration may be stored in a safe attachment policy object that includes a safe attachment policy and one or more safe attachment rules.

According to other examples, a method executed at one or more computing devices to provide dynamic attachment delivery in communications for advanced malicious content filtering is described. The method may include receiving a communication with a potential threat item; if the potential threat item is not a previously assessed item, detaching the potential threat item from the communication and delivering the communication without the potential threat item to a recipient; analyzing the potential threat item for safety status; if the potential threat item is determined to be safe, reattaching the potential threat item to the delivered communication; and if the potential threat item is determined to be unsafe, providing a notification associated with the determination to the recipient.

According to some examples, the potential threat item may be one of an attachment, an embedded object, and a link, and the communication may be one of an email, a text message, a data sharing session, an application sharing session, and a desktop sharing session. The method may further include forking the communication by creating a copy of the communication prior to delivering to the recipient. The method may also include detaching the potential threat item from the original communication; and delivering the original communication without the potential threat item to the recipient.

According to yet other examples, the method may include stamping the copy of the communication with a controlled delivery header; and routing the copy of the communication to a threat assessment hub for scanning. The method may also include converting the scanned communication to a control flow message based on the controlled delivery header. The method may further include intercepting the control flow message; and retrieving a store identifier of the communication based on an internet message identifier.

According to further examples, a computer-readable memory device with instructions stored thereon for dynamic attachment delivery in email exchange for advanced malicious content filtering is described. The instructions may include receiving an email with a potential threat item; if the potential threat item is not a previously assessed item, detaching the potential threat item from the email and delivering the communication without the potential threat item to a recipient client application; analyzing the potential threat item for safety status; if the potential threat item is determined to be safe, reattaching the potential threat item to the delivered email through mailbox synchronization; and if the potential threat item is determined to be unsafe, providing a notification associated with the determination to the recipient client application.

According to some examples, the instructions may also include if the potential threat item is determined to be unsafe, providing a notification associated with the determination to the recipient client application. The potential threat item may be one of an attachment, an embedded object, and a link.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to provide dynamic attachment delivery in emails for advanced malicious content filtering, the computing device comprising:
a memory;
a processor coupled to the memory, the processor configured to execute instructions stored in the memory to:
receive a message indicating a first recipient and including an attachment;
remove the attachment from the message;
insert, into the message with the attachment removed, an attachment placeholder text message including an indication the attachment was removed and is being assessed for a potential threat via an attachment analysis process;
transmit the message with the attachment removed to a communication application associated with the first recipient;
after transmitting the message with the attachment removed and in response to determining that the attachment is safe from the potential threat:
reattach, through mailbox synchronization, the attachment to the message as received at the communication application associated with the first recipient and
add, through mailbox synchronization, a message property to the message as received at the communication application associated with the first recipient indicating the attachment is safe from the potential threat;
receive a resubmission of the message including the attachment, the resubmission of the message indicating a second recipient and including the message property previously added to the message as received at the communication application;
determine, based on the message property included with the resubmission of the message, whether the attachment was previously determined safe from the potential threat; and
in response to the message property included with the resubmission of the message indicating the attachment was previously determined safe from the potential threat, skip assessing the attachment of the resubmission of the message for the potential threat via the attachment analysis process and transmit the resubmission of the message including the attachment to a communication application associated with the second recipient.

2. The computing device according to claim 1, wherein the processor is further configured to:
perform a signature based scan on the message;
perform a top-level attachment typing on the attachment; and
add a hash of the attachment to a message header.

3. The computing device according to claim 1, wherein the processor is further configured to:
perform a check of scope for the attachment based on one or more predefined rules; and
determine if one of a high latency option and a dynamic delivery option is selected.

4. The computing device according to claim 3, wherein the processor is further configured to:
in response to determining the high latency option is selected, apply a controlled delivery stamp to the message and route the message to a threat assessment hub; and
in response to determining the high latency option is not selected, fork the message into a first message copy and a second message copy, wherein the first message copy is stamped with a new stamp, the attachment is removed from the first message copy, and the attachment placeholder is inserted into the first message copy.

5. The computing device according to claim 4, wherein the processor is further configured to:
submit the second message copy for threat assessment scanning, wherein the second message copy contains a message identifier of the first message copy in a header.

6. The computing device according to claim 5, wherein the threat assessment scanning includes:
converting the scanned second message copy to a control flow message based on the header; and
routing the control flow message to a hub transport server.

7. The computing device according to claim 6, wherein the hub transport server is configured to:
intercept the control flow message and retrieve a store identifier of the message based on an internet message identifier;
bind the attachment based on the store identifier; and
reattach the attachment at a mailbox of the first recipient.

8. The computing device according to claim 6, wherein adding the property of the message to indicate the attachment is safe includes adding a safety status of the attachment in a header of the control flow message.

9. The computing device according to claim 6, wherein the hub transport server is further configured to:
replace the attachment with a text attachment informing the recipient about an unsafe status of the attachment in response to determining the attachment is not safe from the potential threat.

10. The computing device according to claim 1, wherein the processor is configured to reattach the attachment to the transmitting message by reattaching the attachment at a mailbox of the first recipient.

11. A method executed on a computing device to provide dynamic attachment delivery in communications for advanced malicious content filtering, the method comprising:
receiving, with a processor, a communication indicating a first recipient and including a potential threat item;
removing, with the processor, the potential threat item from the communication;
inserting into the communication with the potential threat item removed, with the processor, an item placeholder text message including an indication the potential threat item was removed and is being assessed for a potential threat via an attachment analysis process;
transmitting, with the processor, the communication with the item placeholder removed to a communication application associated with the first recipient;
after transmitting the communication with the potential threat item removed and in response to determining the potential threat item is safe:
reattaching, through mailbox synchronization, the potential threat item to the transmitted communication as received at the communication application associated with the first recipient and
adding, through mailbox synchronization, with the processor, a communication property to the communication as received at the communication application associated with the first recipient indicating the potential threat item is safe;
receiving, with the processor, a resubmission of the communication including the potential threat item, the resubmission indicating a second recipient and including the communication property previously added to the communication as received at the communication application;
determining, based on the communication property included with the resubmission of the communication, whether the potential threat item was previously determined safe from the potential threat; and
in response to the message property included with the resubmission of the communication indicating the potential threat item was previously determined safe from the potential threat, skipping assessing the potential threat item of the resubmission of the communication via the attachment analysis process and, transmitting, with the processor, the resubmission of the communication with the potential threat item to a communication application associated with the second recipient.

12. The method according to claim 11, wherein the potential threat item is one of an attachment, an embedded object, and a link, and wherein the communication is one of an email, a text message, a data sharing session, an application sharing session, and a desktop sharing session.

13. The method according to claim 11, further comprising:
forking the communication by creating a copy of the communication prior to transmitting the communication to the communication application associated with the first recipient.

14. The method according to claim 13, further comprising:
detaching the potential threat item from the original communication; and
transmitting the original communication without the potential threat item to the communication application associated with the first recipient.

15. The method according to claim 13, further comprising:
stamping the copy of the communication with a controlled delivery header; and
routing the copy of the communication to a threat assessment hub for scanning.

16. The method according to claim 15, further comprising:
after the scanning, converting the copy of the communication to a control flow message based on the controlled delivery header.

17. The method according to claim 16, further comprising:
intercepting the control flow message; and
retrieving a store identifier of the communication based on an internet message identifier.

18. A server for dynamic attachment delivery in email exchange for advanced malicious content filtering, the server comprising:
a memory configured to store instructions; and
a processor coupled to the memory, the processor, through executing a service in conjunction with instructions stored in the memory, is configured to:
receive an email indicating a first recipient and including a potential threat item;
remove the potential threat item from the email;
insert, in the email with the potential threat item removed, an item placeholder text message including an indication the potential threat item was removed and is being assessed for a potential threat via an attachment analysis process;
transmit the email with the item placeholder removed to a communication application associated with the first recipient;

after transmitting the communication with the potential threat item removed and in response to determining that the potential threat item is safe from the potential threat:
  reattach, through mailbox synchronization, the potential threat item to the transmitted email as received through mailbox synchronization at the communication application associated with the first recipient and
  add, through mailbox synchronization, an email property to the email as received at the communication application associated with the first recipient indicating the potential threat item is safe from the potential threat;
receiving a resubmission of the email including the potential threat item, the resubmission of the email indicating a second recipient and including the email property previously added to the email as received at the communication application;
determining, based on the email property included with the resubmission of the email, whether the potential threat item was previously determined safe from the potential threat; and
  in response to the email property included with the resubmission of the email indicating the potential threat item was previously determined safe from the potential threat, skipping assessing the potential threat item of the resubmission of the communication via the attachment analysis process and transmitting the resubmission of the email with the potential threat item to a communication application associated with the second recipient.

19. The server according to claim 18, wherein the processor is further configured to:
  perform a check of scope for the potential threat item based on one or more predefined rules;
  determine if one of a high latency option and a dynamic delivery option is selected; and
  in response to determining the high latency option is selected, apply a controlled delivery stamp to the email and route the email to a threat assessment hub.

20. The server according to claim 18, wherein the potential threat item is one of an attachment, an embedded object, and a link.

* * * * *